(12) United States Patent
Sim et al.

(10) Patent No.: US 9,651,822 B2
(45) Date of Patent: May 16, 2017

(54) METHOD OF MANUFACTURING A QUANTUM DOT OPTICAL COMPONENT AND BACKLIGHT UNIT HAVING THE QUANTUM DOT OPTICAL COMPONENT

(71) Applicant: Samsung Display Co., Ltd., Yongin, Gyeonggi-Do (KR)

(72) Inventors: Mun-Ki Sim, Seoul (KR); Baek-Hee Lee, Yongin-si (KR); Young-Min Kim, Yongin-si (KR); Hak-Sun Kim, Seoul (KR); Nam-Seok Roh, Seongnam-si (KR); Jae-Byung Park, Seoul (KR); Hae-Il Park, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/515,313

(22) Filed: Oct. 15, 2014

(65) Prior Publication Data

US 2015/0187987 A1    Jul. 2, 2015

(30) Foreign Application Priority Data

Dec. 27, 2013   (KR) ........................ 10-2013-0165581

(51) Int. Cl.
  *H01L 21/00*   (2006.01)
  *G02F 1/1335*  (2006.01)
  *G02F 1/017*   (2006.01)

(52) U.S. Cl.
  CPC ........... *G02F 1/133602* (2013.01); *G02F 2001/01791* (2013.01); *G02F 2001/133614* (2013.01)

(58) Field of Classification Search
  CPC . H01L 2224/48227; H01L 2224/73265; H01L 2224/32225; H01L 2924/00012; H01L 2924/00; H01L 2924/15311; H01L 2924/00014; H01L 51/524; H01L 21/0332; H01L 2224/131; H01L 2224/32145; H01L 2224/451
  See application file for complete search history.

(56) References Cited

U.S. PATENT DOCUMENTS

| | | | |
|---|---|---|---|
| 8,294,168 B2 | 10/2012 | Park et al. | |
| 2008/0061687 A1* | 3/2008 | Cok | H01L 51/5268 313/506 |
| 2008/0172197 A1* | 7/2008 | Skipor | G03B 21/10 702/82 |
| 2009/0162011 A1 | 6/2009 | Coe-Sullivan et al. | |
| 2012/0113672 A1* | 5/2012 | Dubrow | B82Y 20/00 362/602 |
| 2012/0313075 A1 | 12/2012 | Linton et al. | |
| 2013/0114301 A1 | 5/2013 | Um | |
| 2013/0148376 A1 | 6/2013 | Nick et al. | |
| 2013/0223922 A1* | 8/2013 | Koval | C03B 23/245 403/270 |

FOREIGN PATENT DOCUMENTS

KR    1020120002267 A    1/2012

* cited by examiner

*Primary Examiner* — Robert Bachner
(74) *Attorney, Agent, or Firm* — Innovation Counsel LLP

(57) ABSTRACT

A method of manufacturing a quantum dot optical component is provided. By the method, a plurality of quantum dot lines are formed on a first substrate, an encapsulation member that encapsulates the quantum dot lines is formed on the first substrate, a second substrate is laminated on the encapsulation member, and the first and second substrates are cut into a plurality of quantum dot optical components each including at least one of the quantum dot lines.

10 Claims, 16 Drawing Sheets

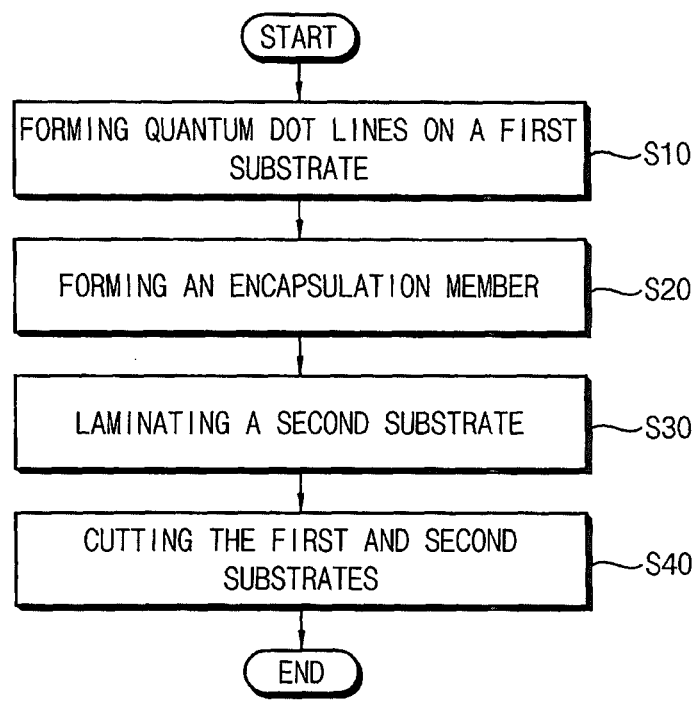
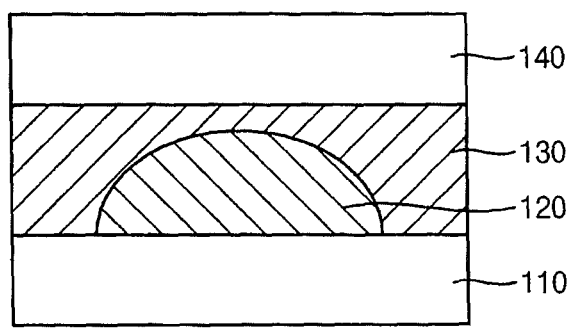

METHOD OF MANUFACTURING A QUANTUM DOT OPTICAL COMPONENT AND BACKLIGHT UNIT HAVING THE QUANTUM DOT OPTICAL COMPONENT

CROSS-REFERENCE TO RELATED APPLICATION(S)

This application claims priority under 35 USC §119 to Korean Patent Application No. 10-2013-0165581, filed on Dec. 27, 2013 in the Korean Intellectual Property Office (KIPO), the contents of which are incorporated herein in its entirety by reference.

BACKGROUND

1. Technical Field

Example embodiments relate generally to a quantum dot optical component. More particularly, embodiments of the present inventive concept relate to a method of manufacturing a quantum dot optical component and a backlight unit having the quantum dot optical component.

2. Description of the Related Art

Generally, a liquid crystal display (LCD) device includes a liquid crystal display panel that displays an image using a light transmission of liquid crystal, and a light source module that provides a light to the liquid crystal display panel. For example, the light source module may be a backlight unit. Recently, a backlight unit that uses blue color diodes as the light source and that emits white color light based on blue color light of the blue color diodes using a quantum dot optical component has been developed. The quantum dot optical component is manufactured by filling a quantum dot into a glass tube and then by encapsulating the glass tube by heat. However, the glass tube and the quantum dot of the quantum dot optical component manufactured by the above method may have defects that occur in an encapsulating process that uses heat. Further, the quantum dot optical component that is manufactured by the above method may not be applied to a display device having a narrow bezel structure because the encapsulation area is not formed to be smooth.

SUMMARY

Some example embodiments provide a method of manufacturing a quantum dot optical component capable of being applied to a display device having a narrow bezel structure.

Some example embodiments provide a backlight unit having a quantum dot optical component.

According to an aspect of example embodiments, a method of manufacturing a quantum dot optical component may include forming a plurality of quantum dot lines on a first substrate, forming an encapsulation member that encapsulates the quantum dot lines on the first substrate, laminating a second substrate on the encapsulation member, and cutting the first and second substrates into a plurality of quantum dot optical components each including at least one of the quantum dot lines.

In example embodiments, the quantum dot lines may be coated on a surface of the first substrate.

In example embodiments, the quantum dot lines may be filled in recess portions that are formed by etching a surface of the first substrate.

In example embodiments, the quantum dot lines may be formed in a full-line shape.

In example embodiments, the quantum dot lines may be formed in a dashed-line shape.

In example embodiments, the quantum dot lines may be a mixture of a quantum dot luminous-body and a resin.

In example embodiments, the encapsulation member may cover the quantum dot lines and an entire surface of the first substrate.

In example embodiments, the encapsulation member may be formed by laminating an organic layer and an inorganic layer.

In example embodiments, the encapsulation member may be a frit that encloses each of the quantum dot lines.

In example embodiments, the frit may include a glass material that is cured by a laser exposure.

In example embodiments, a method of manufacturing a quantum dot optical component may further include forming a reflective layer between the encapsulation member and the second substrate.

According to an aspect of example embodiments, a backlight unit may include a light emitting element configured to emit a first light, a quantum dot optical component configured to receive the first light, and to emit an output light, and a light guide panel configured to uniformly transfer the output light to a target surface.

In example embodiments, the quantum dot optical component may include a first substrate, a quantum dot line formed on the first substrate, an encapsulation member configured to encapsulate the quantum dot line, and a second substrate disposed on the encapsulation member, the second substrate facing the first substrate.

In example embodiments, the quantum dot optical component may further include a reflective layer configured to change a direction of the output light.

In example embodiments, the quantum dot line may be a mixture of a quantum dot luminous-body and a resin.

In example embodiments, the quantum dot line may be formed in a full-line shape.

In example embodiments, the quantum dot line may convert a portion of the first light into a second light and a third light and the output light may be a mixed light of the first light, the second light, and the third light.

In example embodiments, the quantum dot line may be formed in a dashed-line shape.

In example embodiments, the quantum dot line may convert the first light into a fourth light and the output light may be a mixed light of the first light and the fourth light.

Therefore, a method of manufacturing a quantum dot optical component according to example embodiments may provide the quantum dot optical component of which a surface is formed to be smooth by forming quantum dot lines between substrates, by encapsulating the quantum dot lines, and by cutting the substrates. Further, the method of manufacturing the quantum dot optical component may simplify a manufacturing process, may increase productivity, and may decrease manufacturing costs by simultaneously manufacturing the plurality of quantum dot optical components.

In addition, a backlight unit according to example embodiments may implement a display device of which color reproduction is improved by converting a light output from a light emitting element into various color lights.

BRIEF DESCRIPTION OF THE DRAWINGS

Illustrative, non-limiting example embodiments will be more clearly understood from the following detailed description taken in conjunction with the accompanying drawings.

FIG. 1 is a flow chart illustrating a method of manufacturing a quantum dot optical component according to example embodiments.

FIG. 2 is a cross-sectional view illustrating a quantum dot optical component according to example embodiments.

DETAILED DESCRIPTION OF THE EMBODIMENTS

Figure 3A:
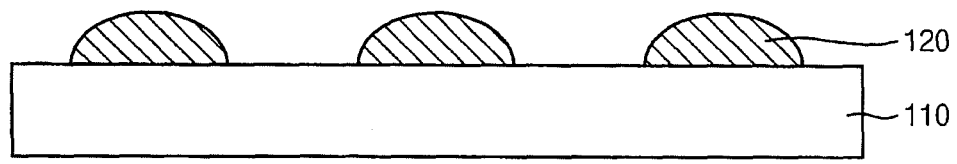
FIGS. 3A, 3B, 3C, 3D are cross-sectional views illustrating a manufacturing process by which the quantum dot optical component of FIG. 2 is manufactured.

Hereinafter, embodiments will be explained in detail with reference to the accompanying drawings.

FIG. 1 is a flow chart illustrating a method of manufacturing a quantum dot optical component according to example embodiments.

Referring to FIG. 1, the method of FIG. 1 may form a plurality of quantum dot lines on a first substrate (S10), and may form an encapsulation member that encapsulates the quantum dot lines on the substrate (S20). Subsequently, the method of FIG. 1 may laminate a second substrate on the encapsulation member (S30), and may cut the first and second substrates into a plurality of quantum dot optical components each including at least one of the quantum dot lines (S40).

Specifically, the method of FIG. 1 may form the quantum dot lines on the first substrate (S10). Here, the first substrate may be a transparent substrate having high light transmission characteristic. For example, the first substrate may be a hard substrate that includes hard materials such as glass, quartz, acryl, polycarbonate, etc, or may be a flexible substrate that includes flexible materials such as epoxy, polyethylene terephthalate (PET), acryl, silicon, etc. In some example embodiments, the quantum dot lines may be a mixture of a quantum dot luminous-body and a resin. The quantum dot luminous-body may be nano crystals of semiconductor material. The quantum dot luminous-body may convert a wavelength of an incident light. The wavelength of the light that is converted by the quantum dot luminous-body may be controlled based on a size of the quantum dot luminous-body. The resin that is mixed with the quantum dot luminous-body may not affect light conversion characteristic of the quantum dot luminous-body. Further, the resin may be a transparent material. For example, the resin may include at least one of toluene, chloroform, and ethanol. Alternatively, the resin may include at least one of polymer resin such as epoxy, silicon, polyethylene, and acrylate. When the resin includes the polymer resin, the quantum dot lines may be cured by ultraviolet rays. The quantum dot lines may be formed on the first substrate using a liquid coating apparatus.

The method of FIG. 1 may form the encapsulation member that encapsulates the quantum dot lines (S20). In some example embodiments, the encapsulation member may cover the quantum dot lines and an entire surface of the first substrate. The quantum dot lines may be prevented from oxygen and moisture penetration by laminating at least one organic layer and at least one inorganic layer on the quantum dot lines that are formed on the first substrate. Here, the organic layer may be formed using organic materials such as epoxy resin, acrylate resin, urethane acrylate resin, etc by a spin coating process, a printing process, a chemical vapor deposition (CVD) process, etc. The inorganic layer may be formed using silicon nitride (SiNx), silicon oxide (SiOx), copper oxide (CuOx), ferrum oxide (FeOx), titanium oxide (TiOx), zinc selenium (ZnSe), aluminum oxide (AlOx), etc by a sputtering process, atomic layer deposition (ALD) process, a plasma enhanced chemical vapor deposition (PECVD) process, etc. In other example embodiments, the encapsulation member may be a frit that encloses each of the quantum dot lines. The quantum dot lines may be prevented from oxygen and moisture penetration by coating the frit around each of the quantum dot lines in a vacuum state and by laminating the second substrate on the frit in the vacuum state. Here, the frit may be a glass material or a mixture of the glass material and a resin that is cured by a laser exposure. The frit may be coated around each of the quantum dot lines using the liquid coating apparatus.

The method of FIG. 1 may laminate the second substrate on the encapsulation member (S30). The second substrate may be the same as or similar to the first substrate. The second substrate may be the transparent substrate having high light transmission characteristic. For example, the second substrate may be the hard substrate that includes hard materials such as glass, quartz, acryl, polycarbonate, etc, or may be the flexible substrate that includes flexible materials such as epoxy, polyethylene terephthalate, acryl, silicon, etc. The second substrate may be laminated on the encapsulation member opposite to the first substrate.

The method of FIG. 1 may cut the first and second substrates into a plurality of quantum dot optical components each including at least one of the quantum dot lines (S40). Each of quantum dot optical components may include the at least one of the quantum dot lines. For example, the first and second substrates may be cut by a cutting process using a cutting device such as a laser, a diamond cutter, etc.

As described above, the method of FIG. 1 may form the quantum dot lines on the first substrate, and may encapsulate the quantum dot lines by forming the encapsulation member. The method of FIG. 1 may laminate the second substrate on the encapsulation member, and may cut the first and second substrates into the plurality of quantum dot optical components. The method of FIG. 1 may manufacture the quantum dot optical component of which surface is formed to be smooth compared to the conventional manufacturing method (i.e., a method of using a glass tube) by forming the quantum dot lines between the first substrate and the second substrate, and by cutting the first and second substrates. Further, the method of FIG. 1 may simplify the manufacturing process, may increase productivity, and may decrease manufacturing costs by simultaneously manufacturing the plurality of quantum dot optical components.

FIG. 2 is a cross-sectional view illustrating a quantum dot optical component according to example embodiments.

Referring to FIG. 2, a quantum dot optical component 100 may include a first substrate 110, a quantum dot line 120, an encapsulation member 130, and a second substrate 140. The first substrate 110 may be a transparent substrate having high light transmission characteristic. For example, the first substrate 110 may be a hard substrate that includes hard materials such as glass, quartz, acryl, polycarbonate, etc, or may be a flexible substrate that includes flexible materials such as epoxy, polyethylene terephthalate, acryl silicon, etc.

The quantum dot line 120 may be a mixture of a quantum dot luminous-body and a resin. The quantum dot luminous-body may be nano crystals of semiconductor material. The quantum dot luminous-body may include silicon (Si)-based nano crystals, Group II-VI-based compound semiconductor nano crystals, Group III-V-based compound semiconductor nano crystals, Group IV-VI-based compound semiconductor nano crystals, or a mixture of the above nano crystals. The quantum dot line 120 may convert a wavelength of an incident light based on a size of the quantum dot luminous-body. The resin that mixed with the quantum dot luminous-body may not affect light conversion characteristic of the quantum dot luminous-body. Further, the resin may be a transparent material. For example, the resin may include at least one of toluene, chloroform, and ethanol. Alternatively, the resin may include at least one of polymer resins such as epoxy, silicon, polyethylene, and acrylate. When the resin includes the polymer resin, the quantum dot line 120 may be cured by ultraviolet rays. The quantum dot line 120 may be formed on the first substrate 110 using a liquid coating apparatus.

In some example embodiments, the encapsulation member 130 may cover the quantum dot line 120 and an entire surface of the first substrate 110. The encapsulation member 130 may prevent the quantum dot line 120 from oxygen and moisture penetration. The encapsulation member 130 may be formed by laminating at least one organic layer and at least one inorganic layer on the first substrate 110. The organic layer may include at least one of epoxy resin, acrylate resin, and urethane acrylate resin. The inorganic layer may include at least one of silicon nitride, silicon oxide, copper oxide, ferrum oxide, titanium oxide, zinc selenium, and aluminum oxide.

The second substrate 140 may be disposed opposite to the first substrate 110. The second substrate 140 may be the same as or similar to the first substrate 110. The second substrate 140 may be the transparent substrate having high light transmission characteristic.

As described above, the quantum dot optical component 100 may convert the wavelength of the incident light by coating the quantum dot line 120 between the first substrate 110 and the second substrate 140. Further, the quantum dot line 120 may be prevented from oxygen and moisture penetration by forming the encapsulation member 130 that covers the quantum dot line 120 and the first substrate 110.

FIGS. 3A through 3D are cross-sectional views illustrating a manufacturing process by which the quantum dot optical component of FIG. 2 is manufactured.

Referring to FIG. 3A, the plurality of quantum dot lines 120 may be coated on the first substrate 110. In some example embodiments, the quantum dot lines 120 may be the mixture of the quantum dot luminous-body and the resin. The quantum dot lines 120 may convert the wavelength of incident light based on the size of the quantum dot luminous-body. The resin that is mixed with the quantum dot luminous-body may not affect the light conversion characteristic of the quantum dot luminous-body. Further, the resin may be the transparent material. The quantum dot lines 120 may be formed on the first substrate using a liquid coating apparatus.

Figure 3B:
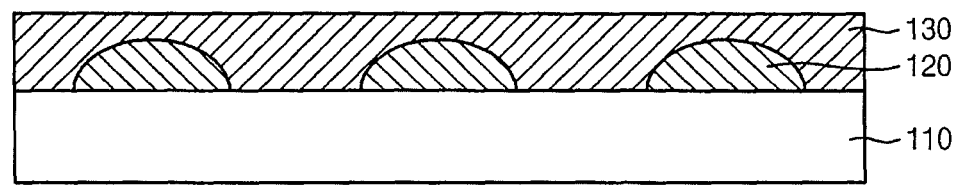

Referring to FIG. 3B, the encapsulation member 130 may be formed to cover the quantum dot lines 120 and the entire surface of the first substrate 110. Here, the encapsulation member 130 may be formed by laminating at least one organic layer and at least one inorganic layer. The encapsulation member 130 may prevent the quantum dot lines 120 from oxygen and moisture penetration.

Figure 3C:
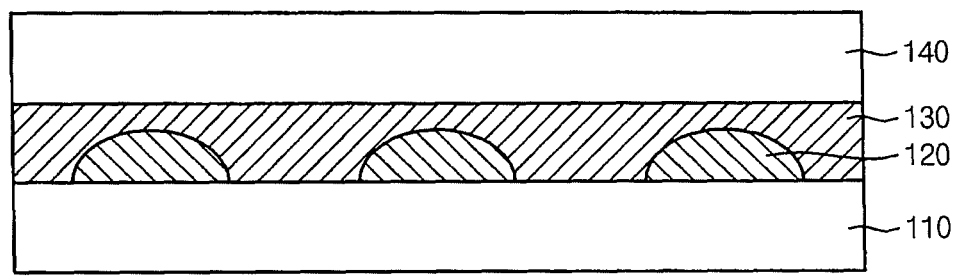

Referring to FIG. 3C, the second substrate 140 may be laminated on the encapsulation member 130. The second substrate 140 may include the transparent substrate having high light transmission characteristic.

Figure 3D:
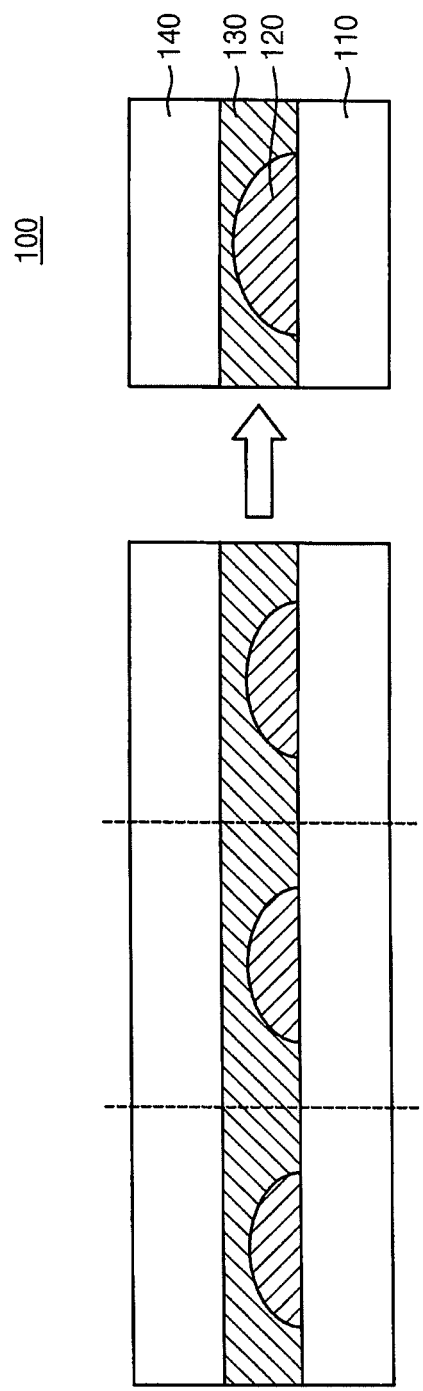

Referring to FIG. 3D, the first and second substrates 110 and 120 may be cut into the plurality of quantum dot optical components 100. For example, the first substrate 110, the encapsulation member 130, and the second substrate 140 may be divided into the plurality of quantum dot optical components 100 each including at least one quantum dot line 120 by a cutting process that uses a cutting device such as a laser, a diamond cutter, etc.

As described above, the quantum dot lines 120 may be coated on the first substrate 110. The encapsulation member 130 may be formed to cover the quantum dot lines 120 and the first substrate 110. The second substrate 140 may be laminated on the encapsulation member 130. The quantum dot optical component 100 may be manufactured by cutting the first substrate 110, the encapsulation member 130, and the second substrate 140. The quantum dot optical component 100 that is manufactured by the above method may have a smooth surface compared to the conventional method that fills the quantum dot into the glass tube and encapsulates the glass tube by heat. Further, the quantum dot optical component 100 may simplify the manufacturing process, may increase productivity, and may decrease manufacturing costs by simultaneously manufacturing the plurality of quantum dot optical components 100.

Figure 4A:
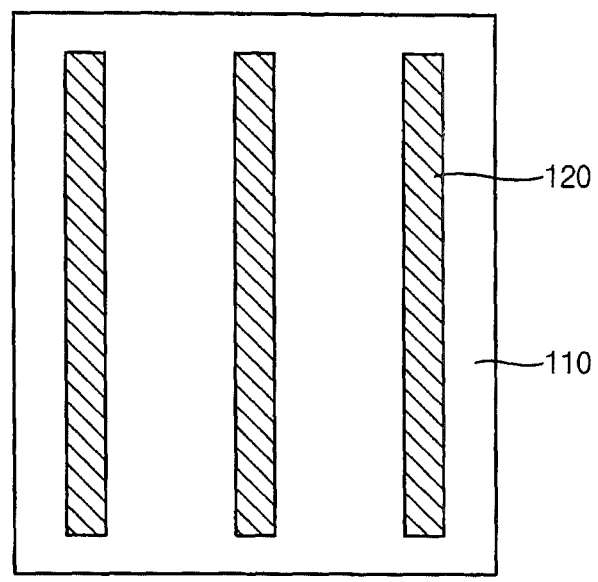
FIG. 4A is a plane view illustrating an example in which quantum dot lines of the quantum dot optical component of FIG. 2 are formed on a substrate.
Figure 4B:
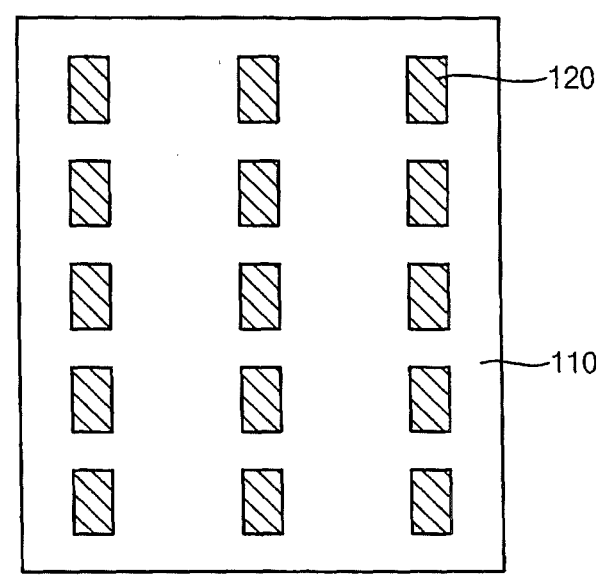
FIG. 4B is a plane view illustrating another example in which quantum dot lines of the quantum dot optical component of FIG. 2 are formed on a substrate.

FIG. 4A is a plane view illustrating an example in which quantum dot lines of the quantum dot optical component of FIG. 2 are formed on a substrate. FIG. 4B is a plane view illustrating another example in which quantum dot lines of the quantum dot optical component of FIG. 2 are formed on a substrate.

Referring to FIG. 4A, the quantum dot lines 120 may be coated on the first substrate 110 in the full-line shape. The quantum dot lines 120 may be coated on the first substrate 110 using a liquid coating apparatus.

Referring to FIG. 4B, the quantum dot lines 120 may be coated on the first substrate 110 in the dashed-line shape. Although the quantum dot lines 120 having the dashed-line shape at regular distance are illustrated in FIG. 4B, the shape of the quantum dot lines is not limited thereto. For example, the quantum dot lines 120 having the dashed-line shape may be formed at predetermined area corresponding to light emitting elements. The quantum dot lines 120 may be coated on the predetermined area of the first substrate 110 using the liquid coating apparatus.

Figure 5:
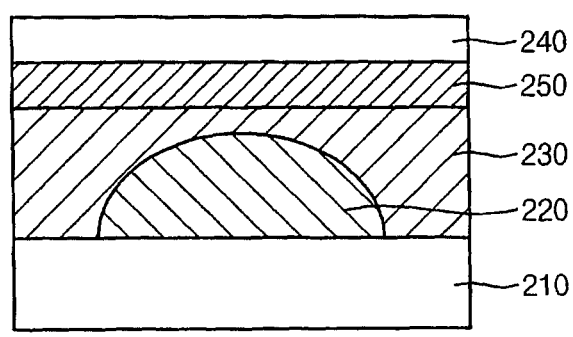
FIG. 5 is a cross-sectional view illustrating an example in which a reflective layer of the quantum dot optical component of FIG. 2 is formed.

FIG. 5 is a cross-sectional view illustrating an example in which a reflective layer of the quantum dot optical component of FIG. 2 is formed. Here, a quantum dot optical component 200 illustrated in FIG. 5 may be the same as or similar to the quantum dot optical component 100 illustrated in FIG. 2 except that a reflective layer 250 is additionally formed. Thus, duplicated description will not be repeated.

Referring to FIG. 5, the quantum dot optical component 200 may include a first substrate 210, a quantum dot line 220, an encapsulation member 230, a reflective layer 250, and a second substrate 240. The reflective layer 250 may be formed on the encapsulation member 230. For example, the quantum dot optical component 200 may receive a light from a light emitting element through the second substrate 240. The light from the light emitting element may be converted by the quantum dot optical component 200 and may be output through the first substrate 210. The output light that is converted in the quantum dot line 220 may proceed in various directions. The reflective layer 250 may increase light emission efficiency by reflecting the output light toward the first substrate 210. For example, the reflective layer 250 may be formed of alumina (Al), argentums (Ag), or metal layer that includes alumina or argentums. Further, the reflective layer 250 may include a dielectric layer to increase reflectivity. For example, the dielectric layer may include silicon oxide, silicon nitride, and titanium oxide. The material that forms the reflective layer 250 and the material that forms the dielectric layer are not limited thereto. The reflective layer 250 may be formed on the encapsulation member 230 using a deposition process. Alternatively, the reflective layer 250 may be a film and may be attached to the encapsulation member 230. As described above, the reflective layer 250 may change the direction of output light. Thus, the light emission efficiency may be increased by forming the reflective layer 250 in the quantum dot optical component 200.

Figure 6:
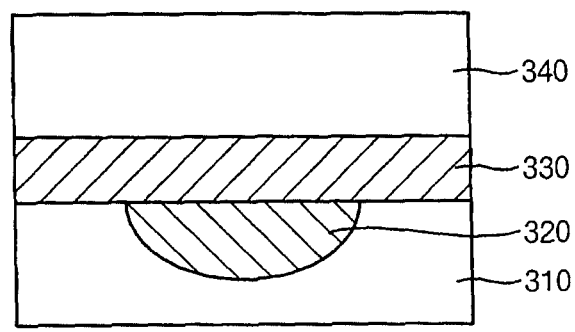
FIG. 6 is a cross-sectional view illustrating a quantum dot optical component according to example embodiments.

FIG. 6 is a cross-sectional view illustrating a quantum dot optical component according to example embodiments. Here, the quantum dot optical component 300 illustrated in FIG. 6 may be the same as or similar to the quantum optical component 100 illustrated in FIG. 2 except that the quantum dot line 320 is filled in a recess portion. Thus, duplicated description will not be repeated.

Referring to FIG. 6, the quantum dot optical component 300 may include a first substrate 310, a quantum dot line 320, an encapsulation member 330, and a second substrate 340. In some example embodiments, the recess portions may be formed on the first substrate 310 by etching a surface of the first substrate 310. The surface of the first substrate 310 may be etched by an etching solution. For example, the etching solution may be a compound having hydrofluoric acid that melts glass material. An organic surfactant or an inorganic surfactant may be added to the etching solution to decrease a thickness deviation of the first substrate 310. The quantum dot lines 320 may be filled in the recess portions that are formed by etching the surface of the first substrate 310. As described above, a thickness of the quantum dot optical component 300 may be decreased by filling the quantum dot lines 320 in the recess portions that are formed by etching the surface of the first substrate 310.

FIGS. 7A through 7E are cross-sectional views illustrating a manufacturing process by which the quantum dot optical component of FIG. 6 is manufactured.

Figure 7A:
FIGS. 7A, 7B, 7C, 7D, 7E are cross-sectional views illustrating a manufacturing process by which the quantum dot optical component of FIG. 6 is manufactured.

Referring to FIG. 7A, the recess portions may be formed on the surface of the first substrate 310 by an etching process. The surface of the first substrate 310 may be etched by an etching solution. Here, the etching solution may be the compound having hydrofluoric acid that melts glass material. The organic surfactant or the inorganic surfactant may be added to the etching solution to decrease the thickness deviation of the first substrate 310.

Figure 7B:

Referring to FIG. 7B, the quantum dot lines 320 may be filled in the recess portions of the first substrate 310. In some example embodiments, the quantum dot lines 320 may be a mixture of a quantum dot luminous-body and a resin. The quantum dot lines 320 may convert a wavelength of incident light based on a size of the quantum dot luminous-body. The resin that is mixed with the quantum dot luminous-body may not affect a light conversion characteristic of the quantum dot luminous-body. Further, the resin may be a transparent material. The quantum dot lines 320 may be filled in the recess portions of the first substrate 310 using a liquid coating apparatus.

Figure 7C:
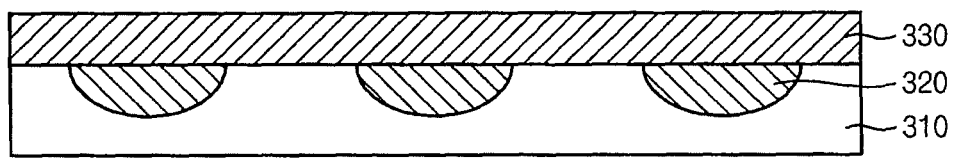

Referring to FIG. 7C, the encapsulation member 330 may be formed to cover the quantum dot lines 320 and an entire surface of the first substrate 310. Here, the encapsulation member 330 may be formed by laminating at least one organic layer and at least one inorganic layer. The encapsulation member 330 may prevent the quantum dot lines 320 from oxygen and moisture penetration.

Figure 7D:
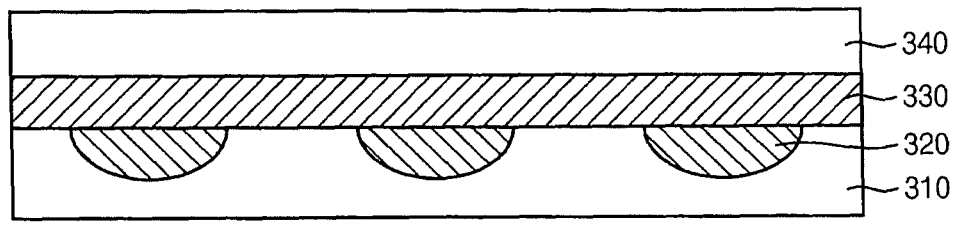

Referring to FIG. 7D, the second substrate 340 may be laminated on the encapsulation member 330. The second substrate 340 may include a transparent substrate having high light transmission characteristic.

Figure 7E:
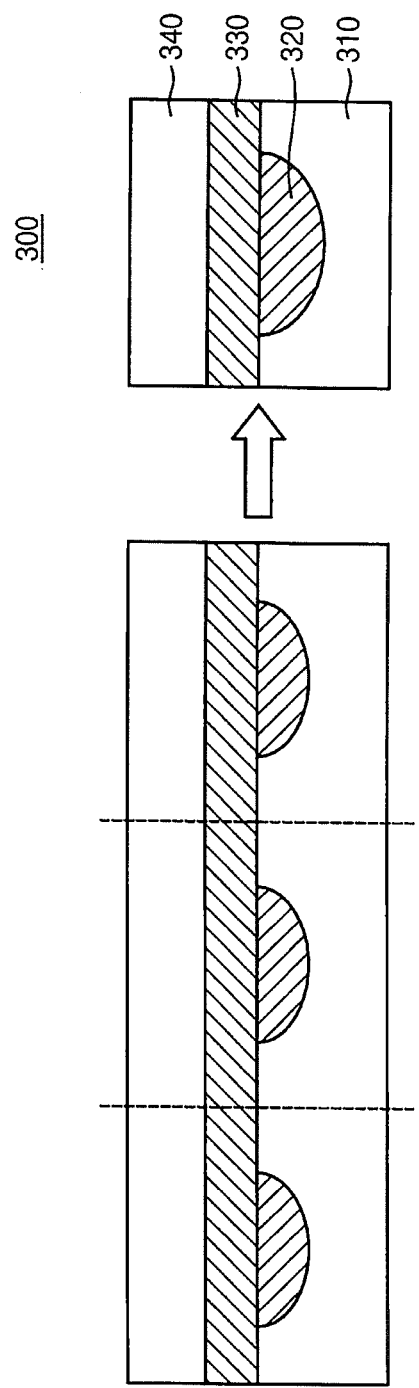

Referring to FIG. 7E, the first and second substrates 310 and 320 may be cut into the plurality of quantum dot optical components 300. For example, the first substrate 310, the encapsulation member 330, and the second substrate 340 may be divided into the plurality of quantum dot optical components 300 each including at least one quantum dot line 320 by a cutting process using a cutting device such as a laser, a diamond cutter, etc.

As described above, the quantum dot lines 320 may be filled in the recess portions of the first substrate 310, and the encapsulation member 330 may be formed to cover the quantum dot lines 320 and the first substrate 310. The second substrate 340 may be laminated on the encapsulation member 330, and the quantum dot optical component 300 may be manufactured by cutting the first substrate 310, the encapsulation member 330, and the second substrate 340. The quantum dot optical component 300 that is manufactured by the above method may have a smooth surface compared to the conventional method that fills the quantum dot into the glass tube and encapsulates the glass tube by heat. Here, the thickness of the quantum dot optical component 300 may be decreased by filling the quantum dot lines 320 in the recess portions of the first substrate 310. Further, the quantum dot optical component 300 may simplify the manufacturing process, may increase productivity, and may decrease manufacturing costs by simultaneously manufacturing the plurality of quantum dot optical components 300.

Figure 8A:
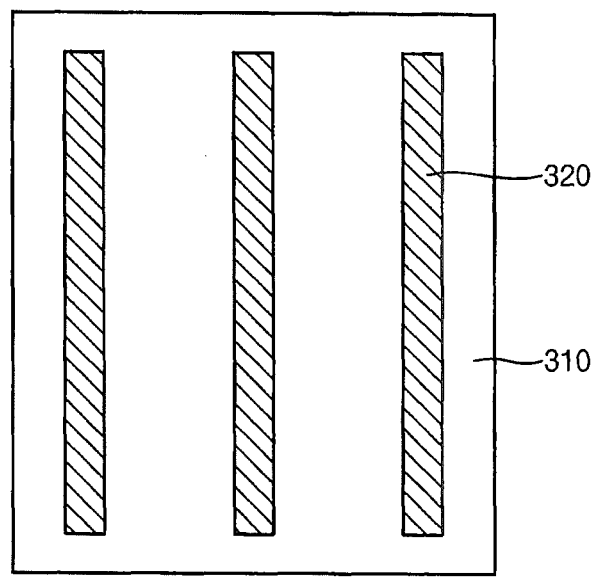
FIG. 8A is a plane view illustrating an example in which quantum dot lines of the quantum dot optical component of FIG. 6 are formed on a substrate.
Figure 8B:
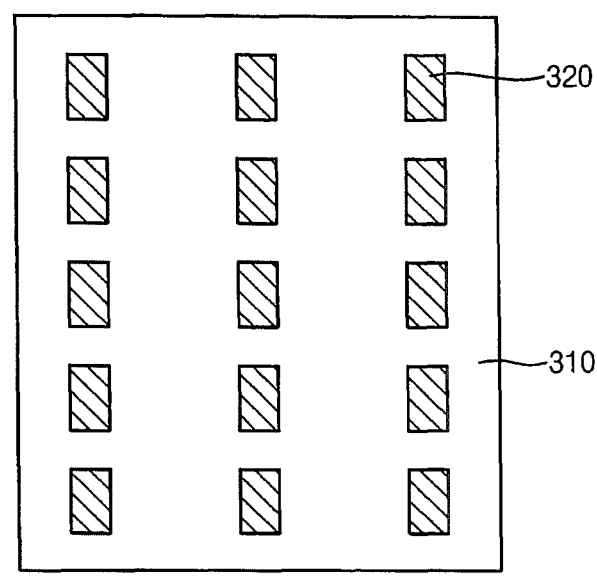
FIG. 8B is a plane view illustrating another example in which quantum dot lines of the quantum dot optical component of FIG. 6 are formed on a substrate.

FIG. 8A is a plane view illustrating an example in which quantum dot lines of the quantum dot optical component of FIG. 6 are formed on a substrate. FIG. 8B is a plane view illustrating another example in which quantum dot lines of the quantum dot optical component of FIG. 6 are formed on a substrate.

Referring to FIG. 8A, the recess portions may be formed on the first substrate 310 in a full-line shape, and the quantum dot lines 320 may be filled in the recess portions.

Referring to FIG. 8B, the recess portions may be formed on the first substrate 310 in a dashed-line shape, and the quantum dot lines 320 may be filled in the recess portions. Although the quantum dot lines 320 having the dashed-line shape at regular distance are illustrated in FIG. 8B, the shape of the quantum dot lines are not limited thereto. For example, the quantum dot lines 320 having the dashed-line shape may be formed at predetermined area corresponding to light emitting elements.

Figure 9:
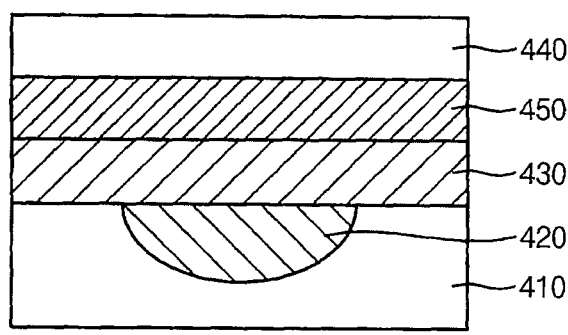
FIG. 9 is a cross-sectional view illustrating an example in which a reflective layer of the quantum dot optical component of FIG. 6 is formed.

FIG. 9 is a cross-sectional view illustrating an example that a reflective layer of the quantum dot optical component of FIG. 6 is formed. Here, a quantum dot optical component 400 illustrated in FIG. 9 may be the same as or similar to the quantum dot optical component 300 illustrated in FIG. 6 except that a reflective layer 450 is additionally formed. Thus, duplicated description will not be repeated.

Referring to FIG. 9, the quantum dot optical component 400 may include a first substrate 410, a quantum dot line 420, an encapsulation member 430, a reflective layer 450, and a second substrate 440. The reflective layer 450 may be formed on the encapsulation member 430. For example, the quantum dot optical component 400 may receive a light from a light emitting element through the second substrate 440, and may emit a light of which a wavelength is converted through the first substrate 410. The output light of which the wavelength is converted in the quantum dot line 420 may proceed in various directions. The reflective layer 450 may increase light emission efficiency by reflecting the output light. The direction of the output light may be changed toward the first substrate 410. For example, the reflective layer 450 may be formed of alumina, argentums, or metal layer that includes alumina or argentums. Further, the reflective layer 450 may include a dielectric layer to increase reflectivity. For example, the dielectric layer may include silicon oxide, silicon nitride, and titanium oxide. The material that forms the reflective layer 450 and the material that forms the dielectric layer are not limited thereto. The reflective layer 450 may be formed on the encapsulation member 430 using a deposition process. Alternatively, the reflective layer 450 may be a film and may be attached to the encapsulation member 430. As described above, to the reflective layer 450 may change the direction of the output light. Thus, the light emission efficiency may be increased by forming the reflective layer 450 in the quantum dot optical component 400.

Figure 10:
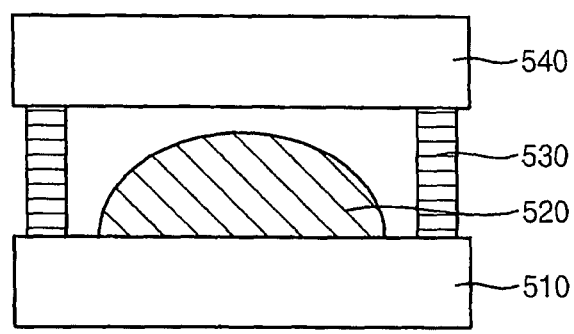
FIG. 10 is a cross-sectional view illustrating a quantum dot optical component according to example embodiments.

FIG. 10 is a cross-sectional view illustrating a quantum dot optical component according to example embodiments. Here, the quantum dot optical component 500 illustrated in FIG. 10 may be the same as or similar to the quantum dot optical component 100 illustrated in FIG. 2 except that an encapsulation member 530 is formed to enclose each of quantum dot lines 520. Thus, duplicated description will not be repeated.

Referring to FIG. 10, the quantum dot optical component 500 may include a first substrate 510, a quantum dot line 520, an encapsulation member 530, and a second substrate 540. The quantum dot line 520 may be coated on the first substrate 510 using a liquid coating apparatus. In some example embodiments, the encapsulation member 530 may be a frit that encloses each of the quantum dot lines 520. The quantum dot lines may be prevented from oxygen and moisture penetration by forming the frit to each of the quantum dot lines 520 and by laminating the second substrate 540 on the frit in a vacuum state. Here, the frit may be a glass material or a mixture of the glass material and a resin that is cured by a laser exposure.

As described, the quantum dot line 520 may be prevented from oxygen and moisture penetration by forming the encapsulation member 530 that is the frit to enclose each of the quantum dot lines 520. Further, the encapsulation member 530 that is the frit may improve (i.e. increase) an adhesion between the first substrate 510 and the second substrate 540 by being cured using the laser exposure.

FIGS. 11A through 11D are cross-sectional views illustrating a manufacturing process by which the quantum dot optical component of FIG. 10 is manufactured.

Figure 11A:
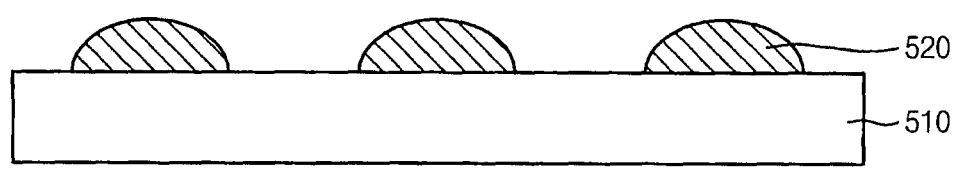
FIGS. 11A, 11B, 11C, 11D are cross-sectional views illustrating a manufacturing process by which the quantum dot optical component of FIG. 10 is manufactured.

Referring to FIG. 11A, the plurality of quantum dot lines 520 may be coated on the first substrate 510. In some example embodiments, the quantum dot lines 520 may be a mixture of a quantum dot luminous-body and a resin. The quantum dot lines 520 may convert a wavelength of incident light based on a size of the quantum dot luminous-body. The resin that is mixed with the quantum dot luminous-body may not affect a light conversion characteristic of the quantum dot luminous-body. Further, the resin may be a transparent material. The quantum dot lines 520 may be formed on the first substrate using a liquid coating apparatus.

Figure 11B:
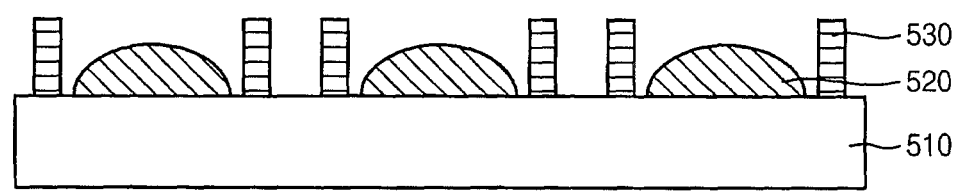

Referring to FIG. 11B, the encapsulation member 530 may be formed to enclose each of the quantum dot lines 520. In some example embodiments, the encapsulation member 530 may be the frit that encloses each of the quantum dot lines 520. The frit may be coated around the quantum dot lines 520 using the liquid coating apparatus. The frit may be the glass material or the mixture of the glass material and the resin that is cured by the laser exposure. However, the material of the frit is not limited thereto. The frit may be formed in a vacuum state to prevent particles to penetrate into the quantum dot lines 520.

Figure 11C:
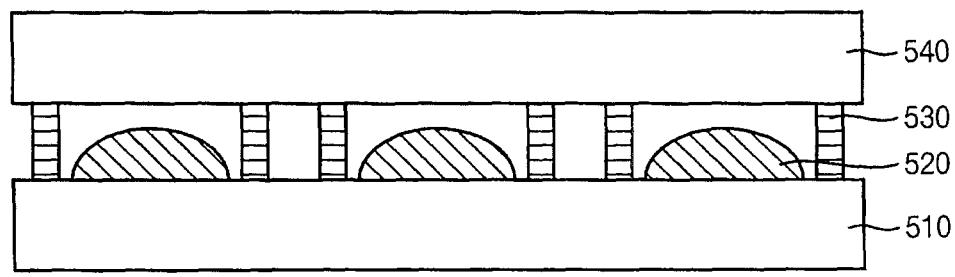

Referring to FIG. 11C, the second substrate 540 may be laminated on the encapsulation member 530. The second substrate 540 may be laminated in the vacuum state to prevent particles to penetrate into the quantum dot lines 520.

Figure 11D:
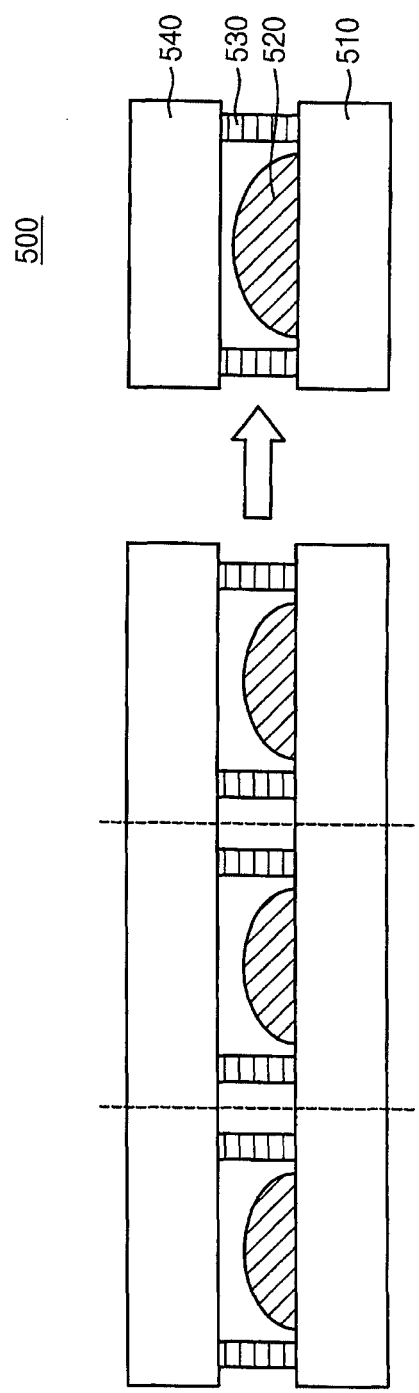

Referring to FIG. 11D, the first and second substrates 510 and 540 may be cut into a plurality of quantum dot optical components 500. For example, the first substrate 510 and the second substrate 540 may be divided into the plurality of quantum dot optical components 500 each including at least one quantum dot line 520 by a cutting process using a cutting device such as a laser, a diamond cutter, etc.

As described above, the quantum dot lines 520 may be coated on the first substrate 510, and the encapsulation member 530 that is the frit may be formed to enclose each of the quantum dot lines 520. The second substrate 540 may be laminated on the encapsulation member 530, and the quantum dot optical component 500 may be manufactured by cutting the first and second substrates 510 and 540. The quantum dot optical component 500 that is manufactured by the above method may have a smooth surface compared to the conventional method that fills the quantum dot into the glass tube and encapsulates the glass tube by heat. Further, the quantum dot optical component 500 may simplify the manufacturing process, may increase productivity, and may decrease manufacturing costs by simultaneously manufacturing the plurality of quantum dot optical components 500.

Figure 12A:
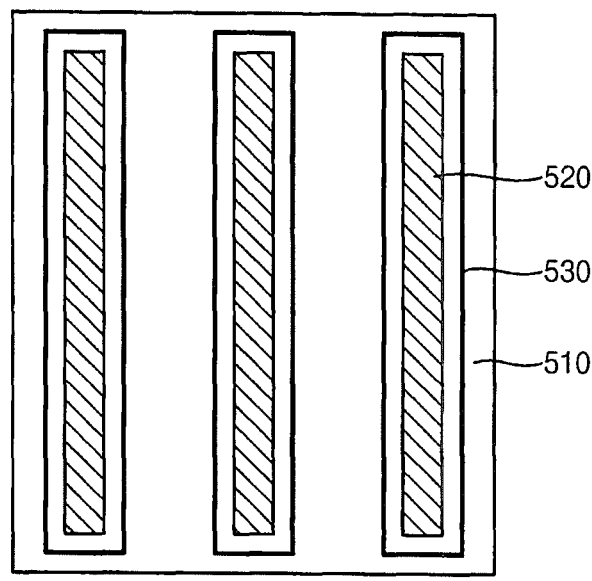
FIG. 12A is a plane view illustrating an example in which quantum dot lines of the quantum dot optical component of FIG. 10 are formed on a substrate.
Figure 12B:
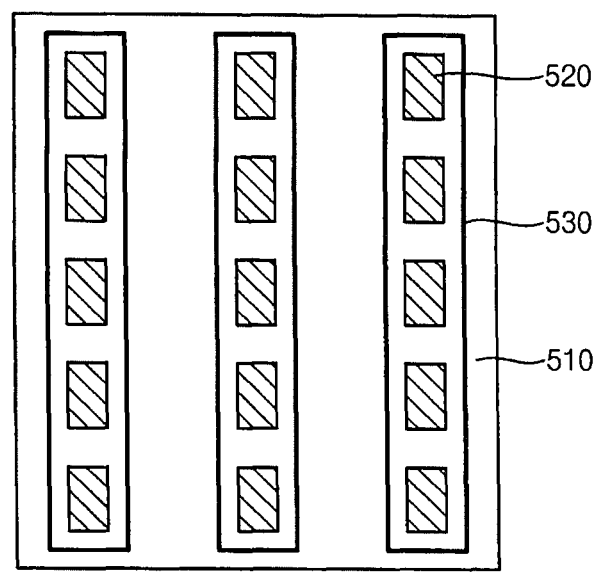
FIG. 12B is a plane view illustrating another example in which quantum dot lines of the quantum dot optical component of FIG. 10 are formed on a substrate.

FIG. 12A is a plane view illustrating an example in which quantum dot lines of the quantum dot optical component of FIG. 10 are formed on a substrate. FIG. 12B is a plane view illustrating another example in which quantum dot lines of the quantum dot optical component of FIG. 10 are formed on a substrate.

Referring to FIG. 12A, the quantum dot lines 520 may be coated on the first substrate 510 in a full-line shape. The quantum dot lines 520 may be coated on the first substrate 510 using the liquid coating apparatus. Here, the encapsulation member 530 may be formed to enclose each of the quantum dot lines 520. In some example embodiments, the encapsulation member 530 may be the frit that includes the glass material, and the frit may be cured by the laser exposure. The encapsulation member 530 that is the frit may be coated on the first substrate 510 using the liquid coating apparatus.

Referring to FIG. 12B, the quantum dot lines 520 may be coated on the first substrate 510 in a dashed-line shape. Although the quantum dot lines 520 having the dashed-line shape at regular distance are illustrated in FIG. 12B, the shape of the quantum dot lines is not limited thereto. For example, the quantum dot lines 520 having the dashed-line shape may be formed at predetermined area corresponding to light emitting elements. The quantum dot lines 520 may be coated on the predetermined area of the first substrate 510 using the liquid coating apparatus. Here, the encapsulation member 530 may be formed to enclose each of the quantum dot lines 520. In some example embodiments, the encapsulation member 530 may be the frit that includes the glass material, and the frit may be cured by the laser exposure. The encapsulation member 530 that is the frit may be coated on the first substrate 510 using the liquid coating apparatus.

Figure 13:
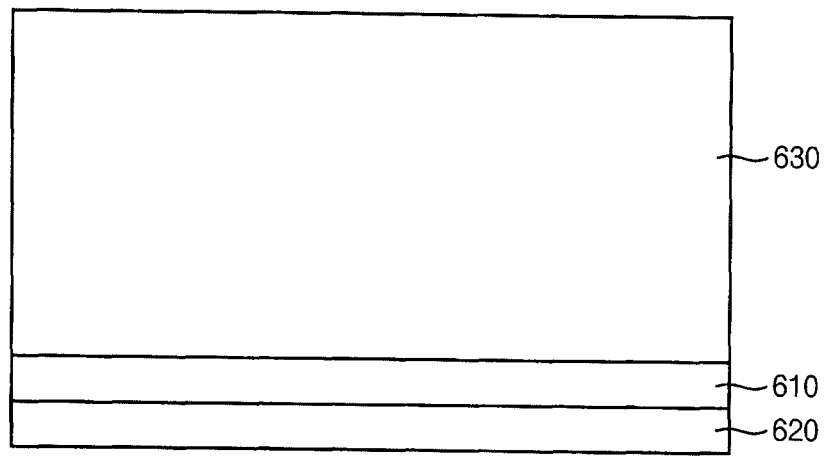
FIG. 13 is a plane view illustrating a backlight unit according to example embodiments.

FIG. 13 is a plane view illustrating a backlight unit according to example embodiments.

Referring to FIG. 13, a backlight unit 600 may include a quantum dot optical component 610, a light emitting element 620, and a light guide panel 630. The light emitting element 620 may emit a light having predetermined wavelength. The light emitting element 620 may be formed by mounting a plurality of light emitting diode chips on a circuit board such as a printed circuit board (PCB). In some example embodiments, the light emitting element 620 may emit a first light. The quantum dot optical component 610 may be disposed between the light emitting element 620 and the light guide panel 630. The quantum dot optical component 610 may convert the light emitted from the light emitting element 620 to a light having predetermined wavelength. In some example embodiments, the quantum dot optical component 610 may convert the first light emitted from the light emitting element 620 to an output light having predetermined wavelength. The quantum dot optical component 610 may include a first substrate, a quantum dot line, an encapsulation member, and a second substrate. Here, the quantum dot optical component 610 illustrated in FIG. 13 may correspond to the quantum dot optical component 100, 200, 300, 400 and 500 of FIGS. 2, 5, 6, 9, and 10. In some example embodiments, the quantum dot line may be a mixture of a quantum dot luminous-body and a resin. The quantum dot luminous-body may be nano crystals of semiconductor material. The quantum dot line may convert a wavelength of an incident light based on a size of the quantum dot luminous-body. When the size of the quantum dot luminous-body is relatively small, a light having relatively short wavelength may be emitted from the quantum dot optical component 610. When the size of the quantum dot luminous-body is relatively big, a light having relatively long wavelength may be emitted from the quantum dot optical component 610. The quantum dot line that has the same size of the quantum dot luminous-body may emit a light having predetermined wavelength. The quantum dot line that has different size of the quantum dot luminous-body may emit a light having various wavelengths. The light guide panel 630 may uniformly transfer the output light emitted from the quantum dot optical component 610 to a target surface.

Figure 14:
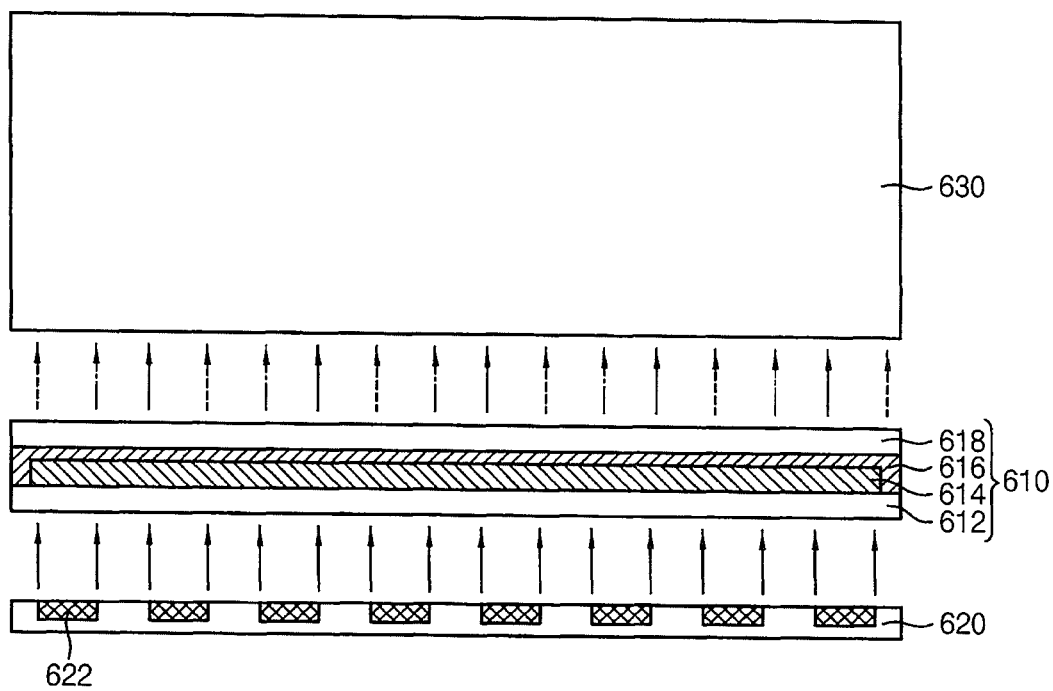
FIG. 14 is a diagram illustrating an example of the backlight unit of FIG. 13.

FIG. 14 is a diagram illustrating an example of the backlight unit of FIG. 13.

Referring to FIG. 14, the backlight unit 600 may include the light emitting element 620, the quantum dot optical component 610, and the light guide panel 630. The quantum dot optical component 610 may include the first substrate 612, the quantum dot line 614, the encapsulation member 616, and the second substrate 618. The light emitting element 620 may include a plurality of light emitting diode chips 622. The light emitting element 620 may emit the first light. The first light from the light emitting element 620 may proceed to the quantum dot optical component 610. The quantum dot line 614 of the quantum dot optical component 610 may be formed in a full-line shape. The encapsulation member 616 may be formed to cover the quantum dot line 614. The encapsulation member 616 may be a frit that encloses each of the quantum dot lines 614 although the encapsulation member 616 that covers the quantum dot lines 614 is illustrated in FIG. 14. The quantum dot line 614 of the quantum dot optical component 610 may convert a portion of the first light into a second light and a third light. The wavelengths of the second light and the third light may be controlled based on a size of the quantum dot luminous-body that is included in the quantum dot line 614. The quantum dot optical component 610 may emit an output light that is a mixed light of the first light, the second light, and the third light toward the light guide panel 630. For example, the first light may be a blue color light, the second light may be a red color light, and the third light may be a green color light. The portion of the blue color light that proceed to the quantum dot optical component 610 may be converted to the red color light and the green color light. The quantum dot optical component 610 may emit a white color light (i.e. the output light) that is the mixed light of the red color light, green color light, and blue color light. The light guide panel 630 may uniformly transfer the output light (i.e., the white color light) into the target surface. Although the backlight unit 600 having the quantum dot optical component 610 that converts the portion of the first light into the second light and the third light and outputs the output light that is the mixed light of the first light, second light, and the third light is described above, a function of the quantum dot optical component 610 is not limited thereto. For example, the quantum dot optical component 610 may include a quantum dot line that converts the blue color light into the white color light.

As described, the backlight unit 600 that includes the quantum dot optical component 610 may convert the portion of the first light output from the light emitting element 620 into the second light and the third light, and may emit the output light that is the mixed light of the first through third lights. Although the first light that is emitted from the organic light emitting diode chips 622 has an output deviation, the backlight unit 600 may emit the output light of which color deviation is suppressed because the first light from the organic light emitting diode chips 622 is mixed with the second and third lights in the quantum dot optical component 610. Thus, a color reproduction of the display device may be improved by the backlight unit 600 that emits light having a relatively small color deviation.

Figure 15:
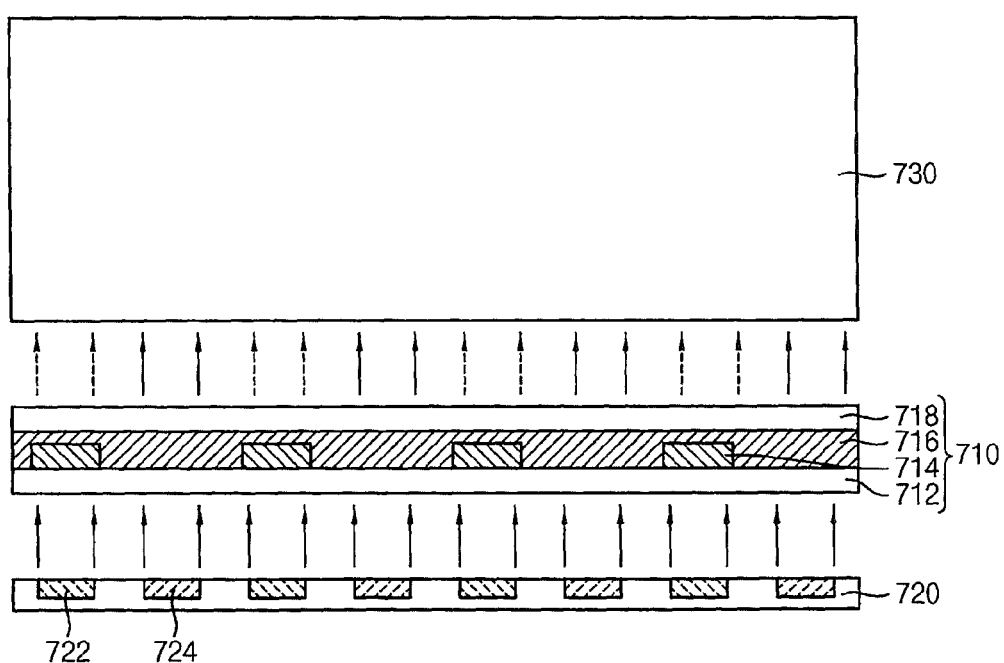
FIG. 15 is a diagram illustrating another example of the backlight unit of FIG. 13.

FIG. 15 is a diagram illustrating another example of the backlight unit of FIG. 13.

Referring to FIG. 15, a backlight unit 700 may include a light emitting element 720, a quantum dot optical component 710, and a light guide panel 730. The quantum dot optical component 710 may include a first substrate 712, a quantum dot line 714, an encapsulation member 716, and a second substrate 718. The light emitting element 720 may include a plurality of light emitting diode chips 722 and 724. The light emitting element 720 may emit a first light. The first light from the light emitting element 720 may proceed to the quantum dot optical component 710. The quantum dot line 714 of the quantum dot optical component 710 may be formed in a dashed-line shape. Here, the quantum dot line 714 may be disposed on predetermined area corresponding to some light emitting diode chips 722 and 724. For example, the quantum dot line 714 may be disposed on an odd numbered light emitting diode chip 722. The encapsulation member 716 of the quantum dot optical component 710 may be formed to cover the quantum dot line 714. The encapsulation member 716 may be a frit that encloses each of the quantum dot lines 714 although the encapsulation member 716 that covers the quantum dot line 714 is illustrated in FIG. 15. The quantum dot line 714 of the quantum dot optical component 710 may convert the first light into a fourth light. For example, in the backlight unit that is driven by dividing one frame into a plurality of sub-frames, the odd numbered light emitting diode chips 722 may emit the light in odd numbered sub-frames, and even numbered light emitting diode chips 724 may emit the light in even numbered sub-frames. Here, the first light emitted from the light emitting element 720 may be converted into the fourth light by passing the quantum dot line 714 in the odd numbered sub-frame. The first light from the light emitting element 720 may be emitted in the even numbered sub-frame. When the odd numbered sub-frame and the even numbered sub-frame are alternately driven, the output light that the first light and the fourth light are mixed may be generated. For example, the first light may be a blue color light, and the fourth light may be a yellow color light. The white color light may be emitted by alternately outputting the blue color light and the yellow color light in the each of sub-frames.

As described, the backlight unit 700 that includes the quantum dot optical component 710 may convert the first light output from the light emitting element 720 into the fourth light, and may emit the output light that is the mixed light of the first light and the fourth light. Here, the first light and the fourth light may be simultaneously or alternately emitted. The backlight unit 700 may have a uniform color coordinates by suppressing an output deviation of the light emitting diode chips 722 and 724 in color distribution. Thus, the backlight unit 700 may improve the color reproduction of the display device.

Figure 16:
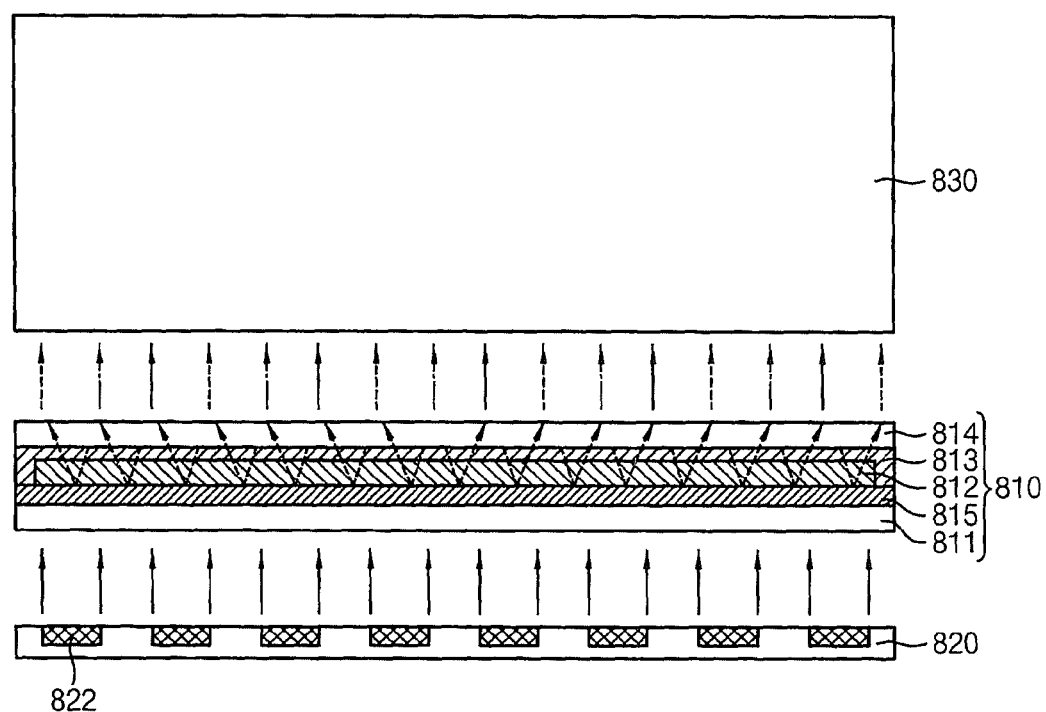
FIG. 16 is a diagram illustrating still another example of the backlight unit of FIG. 13.

FIG. 16 is a diagram illustrating still another example of the backlight unit of FIG. 13.

Referring to FIG. 16, a backlight unit 800 may include a light emitting element 820, a quantum dot optical component 810, and a light guide panel 830. The quantum dot optical component 810 may include a first substrate 811, a quantum dot line 812, an encapsulation member 813, a reflective layer 815, and a second substrate 814. The backlight unit 800 illustrated in FIG. 16 may be the same as or similar to the backlight unit 600 illustrated in FIG. 14 except that the reflective layer 815 is additionally formed. Thus, duplicated description will not be repeated.

Referring to FIG. 16, the quantum dot optical component 810 may include the reflective layer 815. The reflective layer 815 may be formed under the encapsulation member 813. A first light from the light emitting element 820 may proceed to the quantum dot optical component 810. The quantum dot optical component 810 may convert a portion of the first light into a second light and a third light. Here, some portion of the second light and the third light may proceed to the light emitting element 820. The reflective layer 815 may increase light emission efficiency by reflecting the second light and third light. The direction of the second light and the third light that proceed to the light emitting element 820 may be changed to the light guide panel 830. For example, the reflective layer 815 may be formed of alumina, argentums, or metal layer that includes alumina or argentums. The reflective layer 815 may include dielectric layer to increase reflectivity. For example, the dielectric layer may include silicon oxide, silicon nitride, and titanium oxide. The material that forms the reflective layer 815 and the material that forms the dielectric layer are not limited thereto. The reflective layer 815 may be formed using a deposition process. Alternatively, the reflective layer 815 may be a film and may be attached.

As described above, the backlight unit 800 that includes the quantum dot optical component 810 may convert the portion of the first light from the light emitting element 820 into the second light and the third light, and may emit the output light that is the mixed light of the first through third lights. Here, the second light and the third light that proceed to the opposite direction of the light guide panel 830 may be reflected toward the light guide panel 830 by adding the reflective layer 815 in the quantum dot optical component 810. The backlight unit 800 may have a uniform color coordinates by suppressing an output deviation of the light emitting diode chips 822 in color distribution. Thus, the backlight unit 800 may improve the color reproduction of the display device. Further, the quantum dot optical component 810 may increase the light emission efficiency of the backlight unit 800 by including the reflective layer 815.

The present inventive concept may be applied to an electronic device that includes a display device (e.g. a liquid crystal display device) having a backlight unit. For example, the present inventive concept may be applied to a computer monitor, a laptop, a digital camera, a cellular phone, a smart phone, a smart pad, a television, a personal digital assistant (PDA), a portable multimedia player (PMP), a MP3 player, a navigation system, a game console, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of manufacturing a quantum dot optical component comprising:

forming a plurality of parallel quantum dot lines on a first substrate, wherein the quantum dot lines are formed in a full-line shape or in a dashed-line shape;

forming an encapsulation member that encapsulates the quantum dot lines on the first substrate;

laminating a second substrate on the encapsulation member; and cutting the first and second substrates in between each of the quantum dot lines into a plurality of quantum dot optical components each including at least one of the quantum dot lines.

2. The method of claim 1, wherein the quantum dot lines are coated on a surface of the first substrate.

3. The method of claim 1, wherein the quantum dot lines are filled in recess portions that are formed by etching a surface of the first substrate.

4. The method of claim 1, wherein the quantum dot lines are a mixture of a quantum dot luminous-body and a resin.

5. The method of claim 1, wherein the encapsulation member covers the quantum dot lines and an entire surface of the first substrate.

6. The method of claim 5, wherein the encapsulation member is formed by laminating an organic layer and an inorganic layer.

7. The method of claim 1, wherein the encapsulation member is a frit that encloses each of the quantum dot lines.

8. The method of claim 7, wherein the frit includes a glass material that is cured by a laser exposure.

9. The method of claim 1, further comprising: forming a reflective layer between the encapsulation member and the second substrate.

10. The method of claim 1 wherein the cutting comprises cutting the first and second substrates in a direction parallel with the quantum dot lines.

* * * * *